United States Patent
Dais et al.

(10) Patent No.: US 9,469,442 B2
(45) Date of Patent: Oct. 18, 2016

(54) PLASTIC BAGS, ROLLS OF PLASTIC BAGS, AND TUBULAR BLOWN FILM PROCESSES OF MAKING THE SAME

(71) Applicant: S.C. Johnson & Son, Inc., Racine, WI (US)

(72) Inventors: Brian C. Dais, Saginaw, MI (US); Jose Porchia, Saginaw, MI (US); Juan M. Garces, Midland, MI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 14/294,353

(22) Filed: Jun. 3, 2014

(65) Prior Publication Data

US 2014/0353192 A1 Dec. 4, 2014

Related U.S. Application Data

(60) Provisional application No. 61/830,477, filed on Jun. 3, 2013.

(51) Int. Cl.
| | |
|---|---|
| *B65D 30/00* | (2006.01) |
| *B65D 33/00* | (2006.01) |
| *B29C 65/00* | (2006.01) |
| *B29C 47/00* | (2006.01) |
| *B26F 1/00* | (2006.01) |

(Continued)

(52) U.S. Cl.
CPC ............... *B65D 33/002* (2013.01); *B26F 1/00* (2013.01); *B26F 1/18* (2013.01); *B29C 47/0026* (2013.01); *B29C 47/0064* (2013.01); *B29C 47/0066* (2013.01); *B29C 66/4312* (2013.01); *B29C 66/8322* (2013.01); *B29C 66/8511* (2013.01); *B65D 33/007* (2013.01); *B29C 47/0057* (2013.01); *B29C 47/0059* (2013.01); *B29C 55/28* (2013.01); *B29C 65/08* (2013.01); *B29C 65/16* (2013.01); *B29C 65/18* (2013.01); *B29C 65/22* (2013.01); *B29C 65/48* (2013.01); *B29C 65/482* (2013.01); *B29C 65/58* (2013.01); *B29C 65/76* (2013.01); *B29C 66/71* (2013.01); *B29C 2793/0045* (2013.01); *B29D 2009/00* (2013.01); *B29K 2023/00* (2013.01); *B29L 2023/001* (2013.01); *Y10T 156/1054* (2015.01)

(58) Field of Classification Search
CPC ............ B65D 33/002; B65D 33/1608; B65D 33/007; B29D 7/01; B29D 2009/00; B31B 2221/60; B31B 2237/60
USPC ............ 383/35, 65, 37, 61.2, 203, 204, 207; 493/195, 196, 227, 231, 246, 288, 311; 83/333, 428
See application file for complete search history.

(56) References Cited

U.S. PATENT DOCUMENTS 3,559,874 A * 2/1971 Titchenal ......................... 229/69
3,613,524 A * 10/1971 Behr et al. ..................... 493/214

(Continued)

FOREIGN PATENT DOCUMENTS

| JP | 2003104394 A | * | 4/2003 | ............. B65D 33/00 |
| JP | 2010163192 A | * | 7/2010 | |

*Primary Examiner* — Jes F Pascua (57) ABSTRACT

Plastic bags, rolls of plastic bags, and tubular blown film processes for making rolls of plastic bags. The rolls of plastic bags include a tubular blown film with a plurality of perforation lines along which plastic bags are separated from the roll. The perforation lines are formed so that portions of the lips of the plastic bags are offset from each other. The offset portions of the lips facilitate opening of the bags.

7 Claims, 8 Drawing Sheets

(51) Int. Cl.
  *B26F 1/18* (2006.01)
  *B29C 55/28* (2006.01)
  *B29C 65/08* (2006.01)
  *B29C 65/16* (2006.01)
  *B29C 65/22* (2006.01)
  *B29C 65/48* (2006.01)
  *B29C 65/58* (2006.01)
  *B29C 65/76* (2006.01)
  *B29L 23/00* (2006.01)
  *B29K 23/00* (2006.01)
  *B29C 65/18* (2006.01)

(56) References Cited

U.S. PATENT DOCUMENTS

| | | | |
|---|---|---|---|
| 3,744,211 A * | 7/1973 | Titchenal et al. | 53/459 |
| 4,698,274 A * | 10/1987 | Ausnit et al. | 428/35.5 |
| 4,842,907 A * | 6/1989 | VanErden | 428/35.5 |
| 4,892,512 A * | 1/1990 | Branson | 493/194 |
| 4,912,616 A * | 3/1990 | Van Erden | 383/65 |
| 5,007,744 A * | 4/1991 | Scarberry et al. | 383/37 |
| 5,070,584 A | 12/1991 | Dais et al. | |
| 5,118,202 A * | 6/1992 | Bruno | 383/37 |
| 5,246,110 A * | 9/1993 | Greyvenstein | 206/390 |
| 5,683,340 A * | 11/1997 | Belias et al. | 493/195 |
| 7,104,942 B2 * | 9/2006 | Tan | 493/194 |
| 7,784,160 B2 | 8/2010 | Dais et al. | |
| 7,886,412 B2 | 2/2011 | Dais et al. | |
| 7,946,766 B2 | 5/2011 | Dais et al. | |
| 8,061,898 B2 | 11/2011 | Pawloski et al. | |
| 2002/0020648 A1 * | 2/2002 | Lam et al. | 206/390 |
| 2003/0053720 A1 * | 3/2003 | Smith et al. | 383/35 |
| 2005/0078888 A1 * | 4/2005 | Taheri | B31B 19/64 383/107 |
| 2006/0188180 A1 * | 8/2006 | Otsubo | 383/35 |
| 2008/0105679 A1 * | 5/2008 | Ballard | 220/260 |
| 2009/0324141 A1 | 12/2009 | Dais et al. | |
| 2014/0216969 A1 * | 8/2014 | Cherian | 206/461 |

* cited by examiner

PLASTIC BAGS, ROLLS OF PLASTIC BAGS, AND TUBULAR BLOWN FILM PROCESSES OF MAKING THE SAME

BACKGROUND

1. Field of the Invention

Our invention relates to plastic bags and blown film processes for making plastic bags. In specific examples, our invention relates to a roll of plastic bags that is made in a tubular blown film process, with the roll of plastic bags including perforations to separate bags from the roll such that the edges of the bags formed along the perforations facilitate opening of the bags.

2. Related Art

Bags made from flexible plastic materials are well known. Such plastic bags are made in a variety of sizes, and can be used to contain a variety of items, including food, utensils, clothing, tools, etc. For some applications, a roll of joined plastic bags is formed, with the roll including perforations to allow individual bags to be torn away from the rest of the roll. Rolls of plastic bags are provided, for example, in the produce section of a supermarket, where a consumer separates a bag from the roll and then fills the separated bag with the fruits or vegetables for purchase. As another example, a roll of plastic bags is sometimes provided in a compact package, with a user separating an individual bag from the roll in the package. Plastic garbage bags, for example, are sometimes provided in such a roll and compact package.

There are different manufacturing processes used to make plastic bags. In one type of such process, a tubular blown film is first formed and then processed into a roll of un-separated "tube bags." In blown film processes, the tubular blown film is first collapsed, perforations for later separation of the bags are formed in the collapsed tubular blown film, and then the collapsed, perforated film is wound into a roll.

To open a plastic storage bag separated from a roll, the user grasps the lips of the bag that are adjacent to the end with the opening, and then the user pulls the lips in opposite directions to open the opening. Plastic bags often have slick surfaces, however, that are difficult to grasp. Moreover, depending on the type of plastic used to manufacture a given bag, opposite sides of the bag may stick together, thereby making it even more difficult to open the bag. Still further, it is sometimes difficult for a user to distinguish between the end of the bag with the opening and the opposite, permanently sealed end of the bag.

It would be beneficial, therefore, to provide a roll of plastic bags such that, when the bags are separated from the roll, users can easily open the bags. Further, it would be beneficial if such a roll of plastic bags could be manufactured using a blown tubular film process.

SUMMARY OF THE INVENTION

According to one aspect, our invention provides a process of manufacturing a roll of the bags. The process includes forming a tubular blown film, and collapsing the tubular blown film so that the tubular blown film includes a first side, a second side, a first edge, and a second edge. The process also includes perforating the first side of the collapsed tubular blown film to form a plurality of perforation lines, and perforating the second side of the collapsed tubular blown film to form a plurality of perforation lines, wherein at least of portion of each perforation line on the second side is offset from a portion of a corresponding one of the plurality of perforation lines on the first side of the collapsed tubular blown film. The process further includes connecting the first and second sides of the collapsed tubular blown film with a plurality of seals that extend from the first edge of the collapsed tubular blown film to the second edge of the collapsed tubular blown film, and winding the collapsed tubular blown film into a roll.

According to another aspect, our invention provides a roll of connected plastic bags that are to be separated from each other. The roll includes a tubular blown film with (i) a first edge, (ii) a second edge, (iii) a first side, (iv) a second side, (v) a plurality of perforation lines extending along the first side of the tubular blown film, (vi) a plurality of perforation lines extending along the second side of the tubular blown film, each of the plurality of perforation lines on the second side of the tubular blown film corresponding to one of the plurality of perforation lines on the first side of the tubular blown film, and (vii) a plurality of seal lines extending from the first edge of the tubular blown film to the second edge of the tubular blown film, the seal lines connecting the first side of the tubular blown film and the second side of the tubular blown film. A plastic bag to be separated from the roll is delimited by the first edge of the tubular blown film, the second edge of the tubular blown film, two of the plurality of perforation lines on the first side of the tubular blown film, and two of the perforation lines on the second side of the tubular blown film, with the bag encompassing one of the plurality of seal lines. A portion of each of the perforation lines on the first side of the tubular blown film is offset from a portion of a corresponding perforation line on the second side of the tubular blown film such that the first edge of the plastic bag to be separated from the roll includes portions that are offset from each other.

DETAILED DESCRIPTION OF THE INVENTION

Our invention relates to plastic bags and blown film processes for making plastic bags. As will be apparent from the description herein, the term "bag" encompasses a broad range of structures designed to contain items, such as pouches, envelopes, packets, and the like. In general, the term bag, as used herein, simply means a somewhat flexible container with an opening, with the bag being capable of carrying any number of items.

Figure 1:
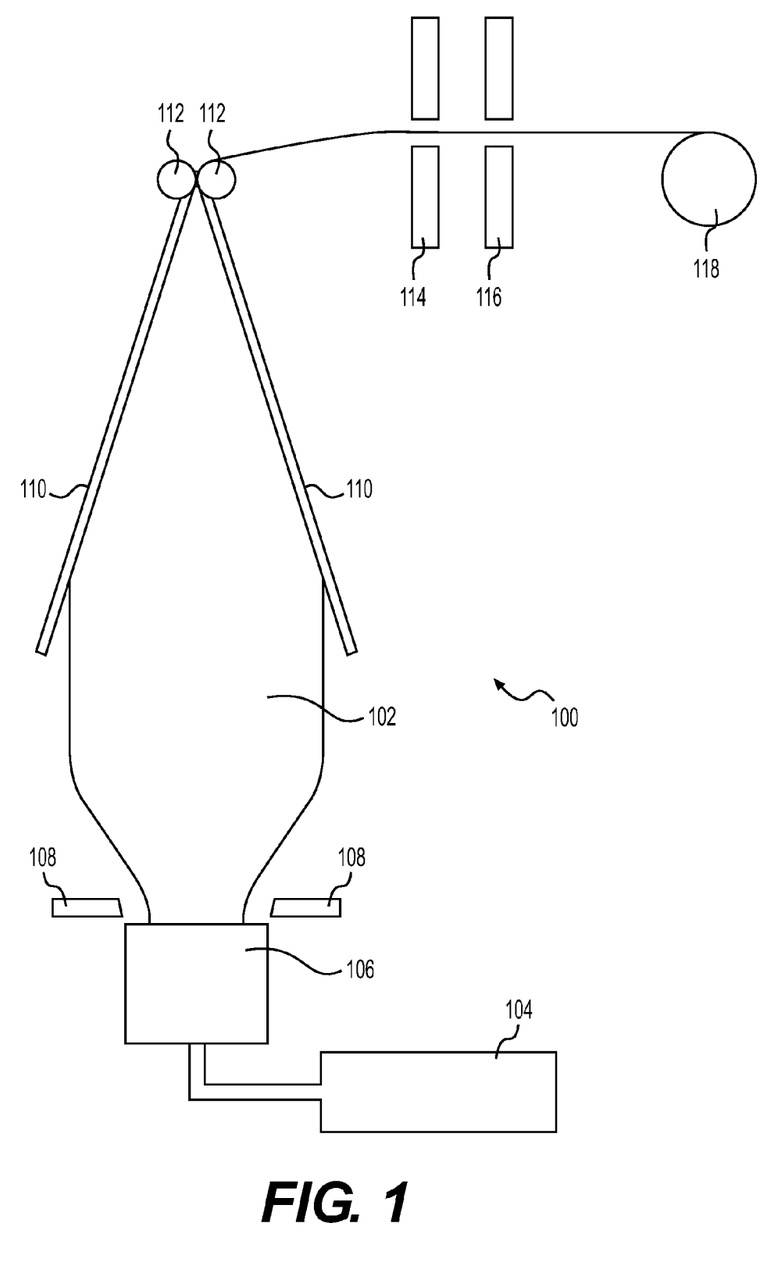
FIG. 1 is a schematic diagram of a tubular blown film process of forming a roll of plastic bags according to an embodiment of our invention.

FIG. 1 is a schematic diagram of a blown film process 100 that can be used to produce a roll of plastic bags according to embodiments of our invention. In this process 100, a tube of blown film 102 is first formed and then processed into a roll of bags 118. The process begins with a plastic material being heated to a molten state in an extruder 104. The molten plastic is transferred from the extruder 104 to an extrusion die 106, and then the molten plastic is forced through an opening in the extrusion die 106 to thereby produce a thick cylindrical tube. A cooling mechanism surrounds the area adjacent to the opening in the extrusion die 106 and directs a cooling agent (e.g., air) to cause the molten plastic to become a more solid state. Also, air may be introduced into the center of the tube adjacent to the opening in the extrusion die 106 in order to bubble or blow the cylindrical tube outwards. The tube of blown film 102 then moves into an area that includes collapsing boards 110, which function to collapse the cylindrical tube of blown film 102. At the end of the collapsing boards 110, the blown film 102 is flattened as it is taken up by a pair of nip rollers 112.

Those skilled in the art will recognize that the steps and apparatus structures used in the blown film process 100, including the processing of the blown film 102 from the extruder 104 to the nip rollers 112, are well known in the art, and that there are a wide variety of additional or alternative steps and apparatus structures that may be used to process the blown film 102 to the point that it is a flattened web exiting the nip rollers 112. Thus, our invention should not be construed as being limited to any of the particular steps and apparatus structures used to process the tubular blown film 102 between the extruder 104 and the nip rollers 112 shown in FIG. 1.

After exiting the nip rollers 112, the collapsed tubular blown film 102 is further processed to form a roll of plastic bags 118. Specifically, a perforation mechanism 114 perforates the tubular blown film 102 to form tear lines that can later be used to separate the individual bags in the roll 118, as will be more fully described below. Those skilled in the art will recognize that a variety of assemblies may be used to perforate the bags, for example, by a die and punch, laser, and hot or cold needles. Such perforating processes could be rotary or linear in motion. Those skilled in the art will also recognize the wide variety of sizes, shapes, and configurations for the perforations that will create tear lines along which single bags can be easily be separated from the rest of the roll 118.

A sealing mechanism 116 also acts on the collapsed tubular blown film 102. As will be evident from the further discussion below, the sealing mechanism forms seal lines along which opposite sides of the film 102 are connected together, with each of the seal lines ultimately providing a sealed end of a plastic bag in the roll 118. Examples of mechanisms and techniques for sealing the film 102 include using a heated element such as a wire, bar, or knife. Other example techniques for sealing the film include using ultrasonic or laser welding, or using solvent or adhesive bonding.

Those skilled in the art will recognize that the relative positioning of the perforation mechanism 114 and the sealing mechanism 116 can be reversed in the process line, i.e., the sealing mechanism can act on the blown tubular film 102 before the perforation mechanism 114. Moreover, in other embodiments of our invention, the perforation and sealing mechanisms 114 and 116 are provided as part of a singular assembly such that the blown film 102 is perforated and sealed at the same time.

After being perforated and sealed, the tubular blown film 102 is wound into the roll 118. After the roll 118 reaches a desired size, the tubular blown film 102 is cut, and the roll 118 is thereby separated from the rest of the tubular blown film 102. The roll 118 is a finished product with plastic bags that can be separated from each other along the perforation lines. Of course, those skilled in the art will recognize that any number of additional processing steps might be conducted before or after the blown film 102 is wound into roll 118. For example, the tubular blown film might be folded in half before being wound into the roll 118.

A number of different types of plastic can be used to form the blown tubular film 102. Illustrative thermoplastic materials that could be used to form the roll of bags include, for example, polypropylene (PP), polyethylene (PE), metallocene-polyethylene (mPE), low density polyethylene (LDPE), linear low density polyethylene (LLDPE), ultra low density polyethylene (ULDPE), biaxially-oriented polyethylene terephthalate (BPET), high density polyethylene (HDPE), polyethylene terephthalate (PET), among other polyolefin plastomers and combinations and blends thereof. Still other materials that may be used include styrenic block copolymers, polyolefin blends, elastomeric alloys, thermoplastic polyurethanes, thermoplastic copolyesters, thermoplastic polyamides, polymers and copolymers of polyvinyl chloride (PVC), polyvinylidene chloride (PVDC), saran polymers, ethylene/vinyl acetate copolymers, cellulose acetates, polyethylene terephthalate (PET), ionomer, polystyrene, polycarbonates, styrene acryloacrylonitrile, aromatic polyesters, linear polyesters, and thermoplastic polyvinyl alcohols. Those skilled in the art will recognize that a wide variety of other plastic materials may also be used as well.

Figure 2A:
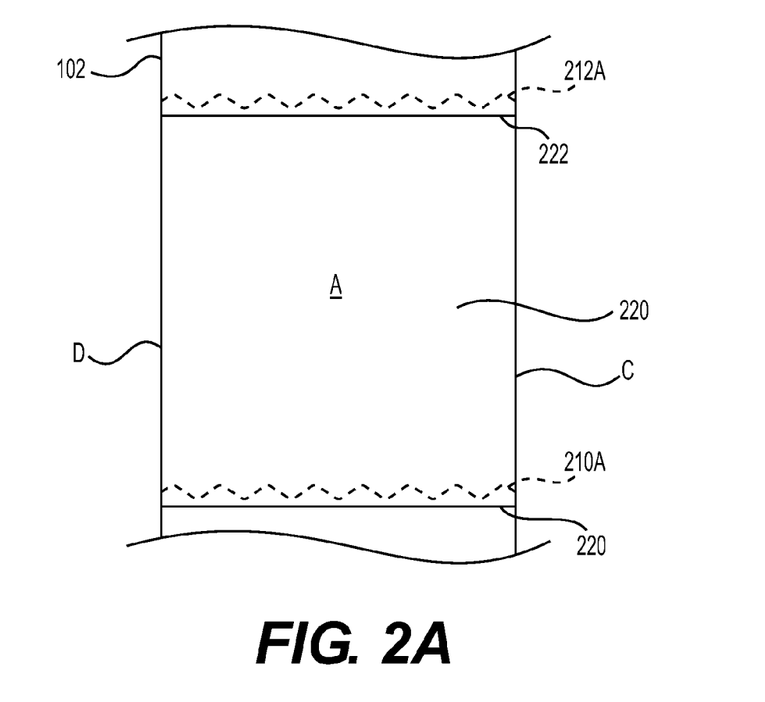
FIGS. 2(A) and 2(B) are views of two of the sides of a collapsed tubular blown film in a process of forming a roll of plastic bags according to an embodiment of our invention.
Figure 2B:
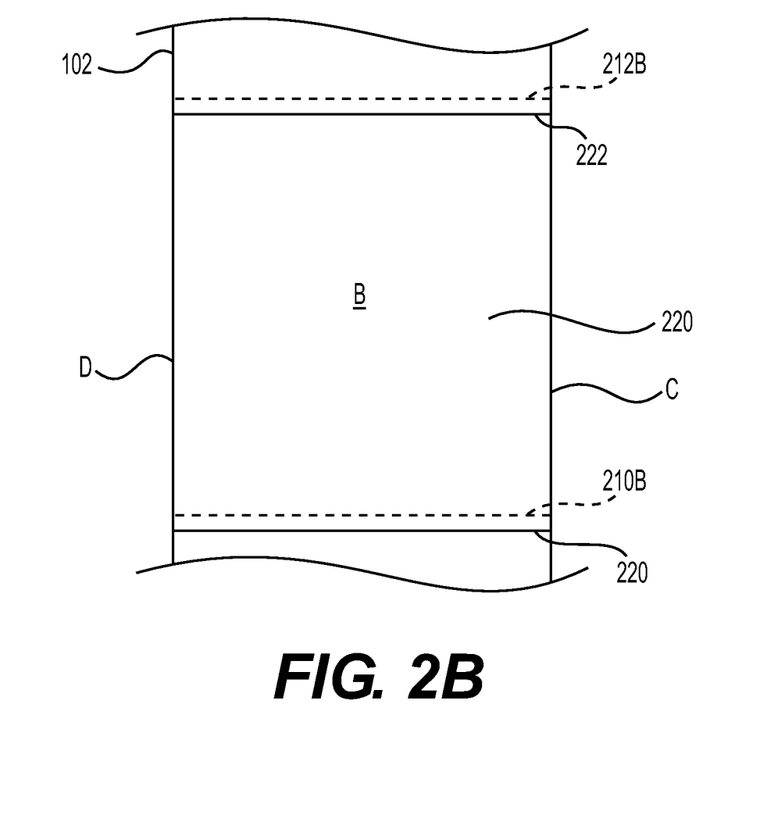

FIGS. 2(A) and 2(B) are views of sides of a section of the collapsed tubular blown film 102 after it has been perforated and sealed, e.g., in the blown film process 100 described above. The perforation lines 210A, 210B, 212A, and 212B are provided adjacent to the seal lines 220 and 222, with the perforation lines 210A, 210B, 212A, and 212B extending over a substantial portion of the length of the film 102 from one edge C to the other edge D, and with the seal lines 220 and 222 extending from the edge C to the edge D. As described above, the perforation lines 210A, 210B, 212A, and 212B are formed such that a user may tear the film 102 along the perforation lines 210A, 210B, 212A, and 212B when separating the bag 220 from the rest of the roll that is formed with the film 102. Thus, the bag 220, to be separated from the finished roll, is defined in the film 102, with the bag having a side A, a second side B, an edge C, a second edge D, a to-be-formed opening along perforation lines 210A and 210B, a sealed edge formed by seal line 222A and separated from an adjacent bag along perforation lines 212A and 212B.

It should be noted that in the embodiment depicted in FIGS. 2(A) and 2(B), the portions of the corresponding perforations lines 210A and 210B, and portions of the corresponding perforation lines 212A and 212B do not directly align with each other, such that portions of the corresponding perforations lines 210A and 210B, and 212A and 212B, are offset from each other. This can be accomplished, for example, by forming the perforations separately on the two sides A and B, with a mandrel or other structure inserted in the center of the tubular blown film 102 during the perforating so that the perforations on one side are not imparted on the other. The perforation lines 210A, 210B, 212A, and 212B form edges of bags in the lip regions of the bags adjacent to the openings of the bags, e.g., in bag 220, the perforation lines 210A and 210B form the edge of the lips of the bag 220. Thus, the offset of the perforation lines 210A and 210B and the offset of perforation lines 212A and 212B result in the edges of the lips in the bags being offset from each other.

Figure 3A:
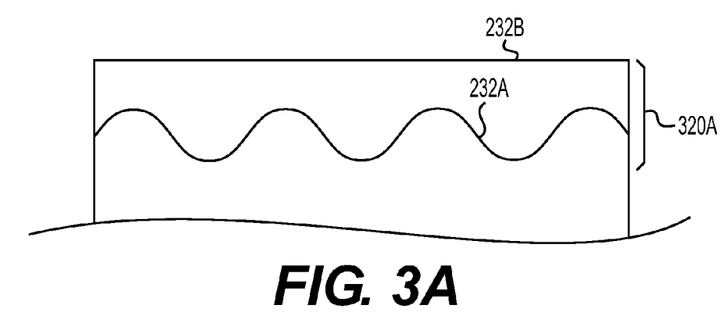
FIGS. 3(A)-3(D) are views of the edges of the lips of plastic bags according to embodiments of our invention.
Figure 3B:
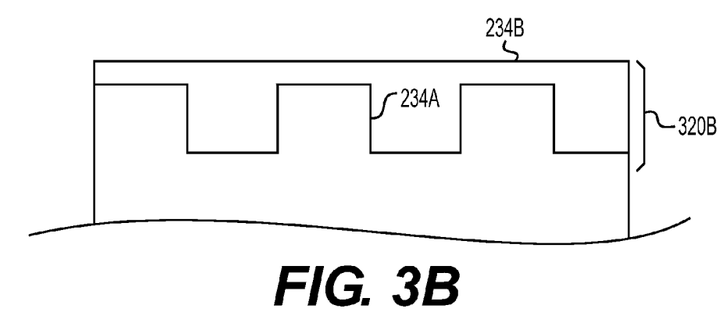
Figure 3C:
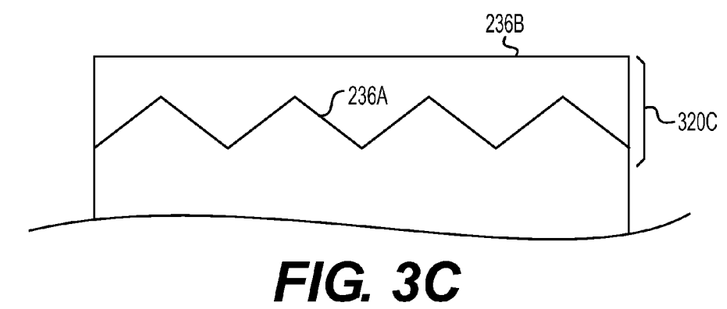
Figure 3D:
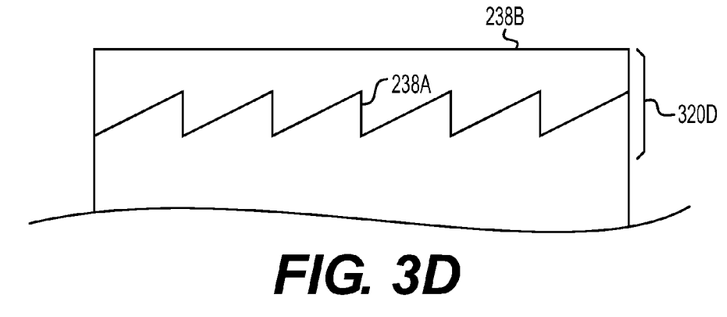

In this regard, FIGS. 3(A)-3(D) are views of the lips 320A, 320B, 320C, and 320D of bags according to embodiments of our invention. As indicated above, the edges of the lips 320A, 320B, 320C, and 320D are formed when the user tears the bags from a roll along the perforation lines formed in a tubular blown film process. Notably, a portion of the lips 320A, 320B, 320C, and 320D is not a straight line so that the non-straight portion is offset from another portion of the lips. For example, as shown in FIG. 3(A), the portion 232A has a sinusoidal pattern, which is offset from a straight portion 232B of the edge. In FIG. 3(B), the portion 234A has a repeating square shape that is offset from the straight portion 234B of the edge. In FIG. 3(C), the edge portion 236A has a repeating triangular shape that is offset from the straight portion 236B of the edge. In FIG. 3(D), the portion 238A has a repeating saw tooth shape that is offset from the straight portion 238A of the edge.

It has been found that a user sometimes has difficulty separating the lips of a plastic bag adjacent to the opening of the bag when there is no offset in different portions of the edges of the lips, e.g., when there is a completely straight entire edge about the opening of the bag. On the other hand, when portions of the edge are offset from other portions, as shown in the examples in FIGS. 3(A)-3(D), the user can more easily identify, grasp, and separate the lip portions of a bag. And, since the edges of the bags according to embodiments of our invention are formed through the use of perforation lines in a roll as described above, the non-straight portions of the edge of the bag can easily be formed in the blown tubular film process described above.

In embodiments of our invention, sealing closure mechanisms may be provided to the tubular blown film used to form a roll of bags. The sealing closure mechanisms provide a resealable closure for the opening bags. Such sealing closure mechanisms are well known in the art, and include those sold under the ZIPLOC® trademark by the assignee of the subject application. Often these sealing closure mechanisms include a pair of interlocking members. Examples of different shapes and configurations of such interlocking members that could be used to form a sealing closure mechanism for plastic bags according to our invention can be seen in U.S. Pat. Nos. 5,070,584; 7,784,160; 7,886,412; 7,946,766; and 8,061,898, and in U.S. Patent Application Publication No. 2009/0324141, the disclosures of which are incorporated by reference herein in their entirety.

Figure 4:
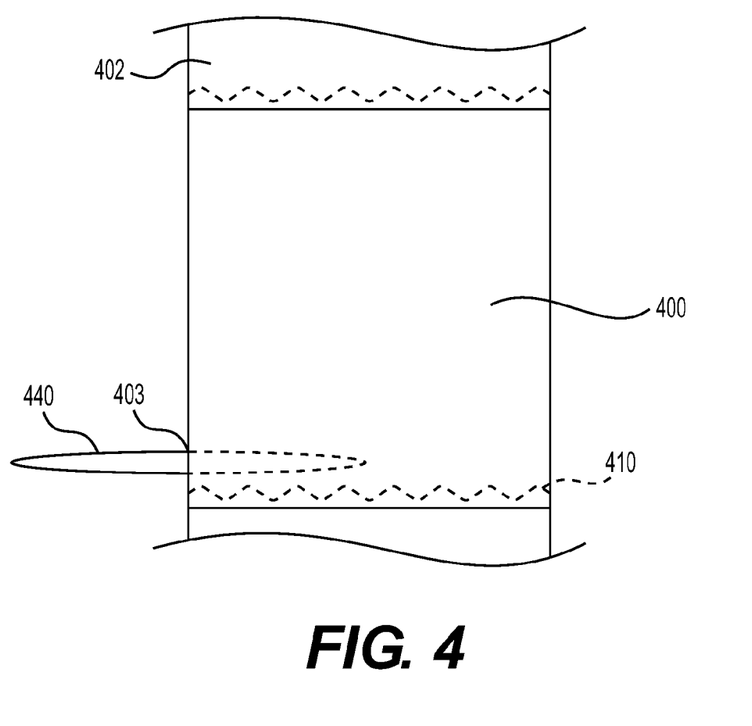
FIG. 4 is a top view of a sealing mechanism being applied to a collapsed tubular blown film in a process of forming a roll of plastic bags according to an embodiment of our invention.

FIG. 4 shows an example of a sealing closure mechanism 440 being applied to a tubular blown film 402 in a process of forming a roll of bags according to an embodiment of the invention. The sealing closure mechanism 440 is inserted in an opening 403 that is cut in the side of the tubular blown film 402. Notably, the sealing closure mechanism 440 is provided adjacent to the perforation line 410. After the sealing mechanism 440 is fully inserted, the sealing closure mechanism 440 is fixed in place, for example, by heat sealing. Thus, when the bag 400 is separated from the rest of the roll formed with tubular blown film 402, the sealing closure mechanism 440 is provided adjacent to the opening of the bag 400 that is formed by the perforation line 410. Note that the sealing closure mechanism 400 may be provided as two parts, e.g., a male part and a female part. The two parts are provided adjacent to each other on what ultimately becomes opposing sides of the bag 400.

Figure 5A:
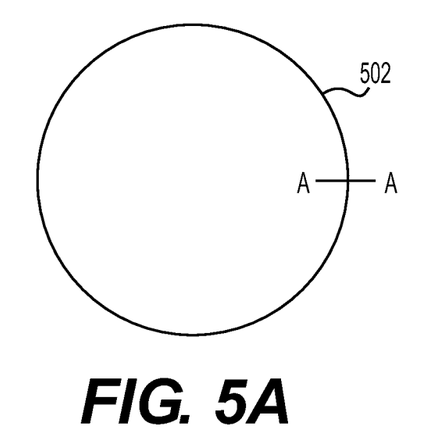
FIGS. 5(A)-5(C) are views of a tubular blown film in a process of making a roll of plastic bags according to another embodiment of our invention.
Figure 5B:
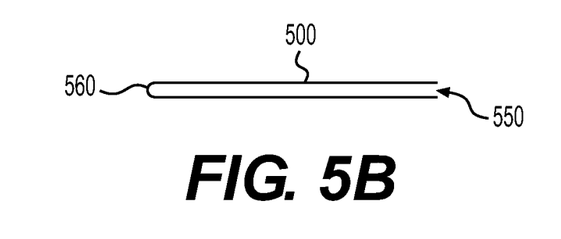
Figure 5C:
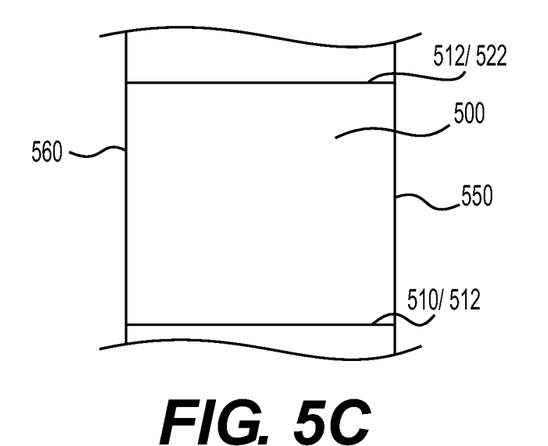

FIGS. 5(A)-5(C) show a process of forming a bag 500 from a tubular blown film 502 according to an alternative embodiment of our invention. In this case, the tubular blown film 502 is cut along a line A-A during a forming process, as shown by a cross section of tubular blown film 502 in FIG. 5(A). When the tubular blown film 502 is collapsed (as shown in FIGS. 5(B) and 5(C)) the slit in the tubular blown film 502 forms the open side 550 of the bag 500, while the side opposite to the open side 550 forms the bottom edge 560 of the bag 500. Because the opening of the bag 500 in this embodiment is formed by cutting the tubular blown film 502, the perforation lines 510 and 512 do not form openings to the bags in the roll formed from the film 502, but rather, delimit sides of the bag 500. As such, the perforation lines 510 and 512 are formed in the same area of the tubular blown film 502 as the seal lines 520 and 522. Thus, when the bag 500 is separated from the rest of the roll, a portion of the seal lines 520 and 522 form opposite sides of the bag 500, and another portion of the seal lines 520 and 522 form the sides of bags formed next to the bag 500 in the roll formed from film 502.

FIGS. 6-9 show additional features and alternative configurations that are provided to plastic bags when using the processes generally described in conjunction with FIGS. 5(A)-5(C).

Figure 6:
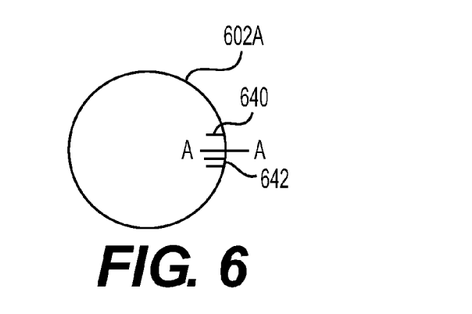
FIG. 6 is a cross-sectional view of a tubular blown film in a process of forming plastic bags according to further embodiments of our invention.

In FIG. 6, a two-part sealing closure mechanism is provided to the tubular blown film 602A, with the sealing closure mechanism including interlocking parts 640 and 642 provided on opposite sides of the line A-A at which the tubular blown film 602A is cut. Thus, when the blown tubular film 602A is collapsed and formed into a roll of bags, the resulting bags in the roll will include the sealing closure mechanism parts 640 and 642 provided about their openings (the openings in the bags having been formed along the line A-A in the blown film 602A).

Figure 7:
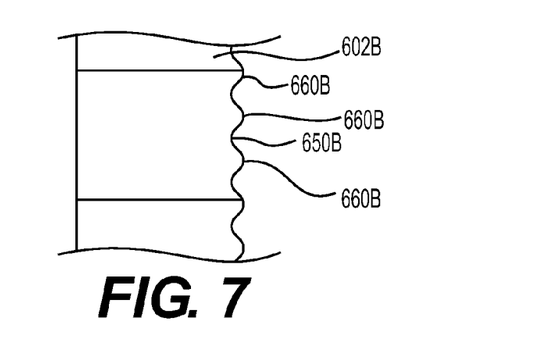
FIG. 7 is a view of a side of a collapsed tubular blown film in a process of forming plastic bags according to an embodiment of our invention.
Figure 8:
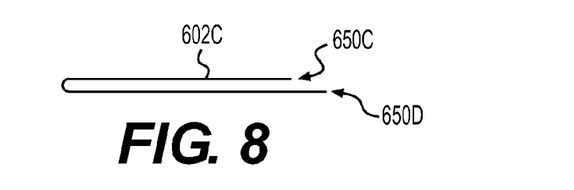
FIG. 8 is a side view of a collapsed tubular blown film in a process of forming plastic bags according to an embodiment of our invention.
Figure 9:
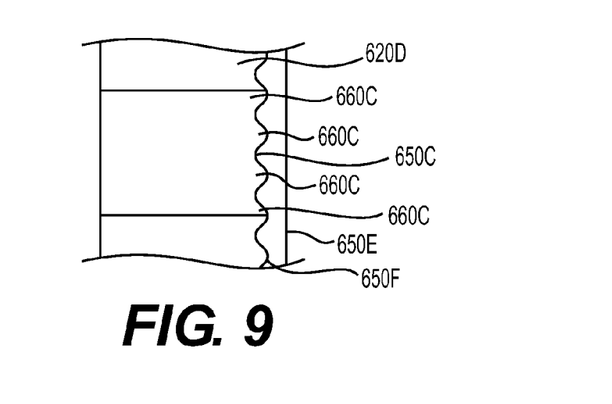
FIG. 9 is a side view of a collapsed tubular blown film in a process of forming plastic bags according to a further embodiment of our invention.

In FIGS. 7-9, the edges of the lips adjacent to the openings of bags in a roll formed from a tubular blown film are provided with different configurations. In FIG. 7, the side 650B of the collapsed blown tubular film 602B that is cut is further cut to form a series of tabs 660B. The tabs are thereby provided in the lips adjacent to the bags formed in a roll from tubular blown film 602B. In FIG. 8, the collapsed tubular blown film 602C is shifted so at the edge 650C on the side of the film 602C with the cut is offset from the other edge 650D. Similarly, in FIG. 9, the collapsed blown tubular film 602D is shifted so that an edge 650E along the side of the film 602D that is cut is offset from the other edge 650F formed on the side that is cut. Further, a portion of the edge 650F is cut to form a series of tabs 660C. As will appreciated by those skilled in the art, the two edges 650E and 650F can be cut by two different cutting tools to provide different shapes to the two edges 650E and 650F. As will also be appreciated from the foregoing description, in the embodiments depicted in FIGS. 6(B)-6(D), the edges of lips of bags that are adjacent to the openings to the bags may include non-straight portions and/or offset portions. Such non-straight and offset edge portions facilitate opening of the bags, as described above.

Figure 10A:
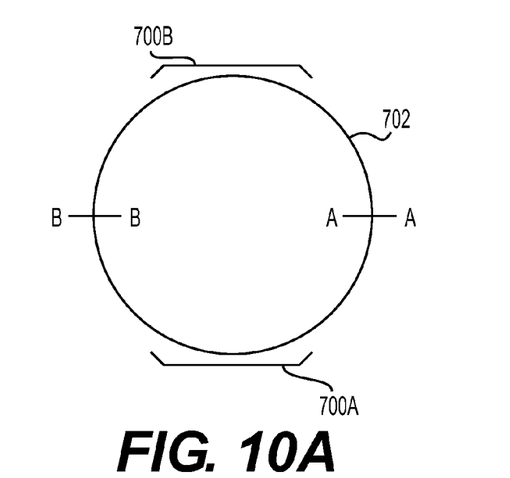
FIGS. 10(A)-10(C) are views of process steps for forming a roll of plastic bags according to a still further embodiment of our invention.
Figure 10B:
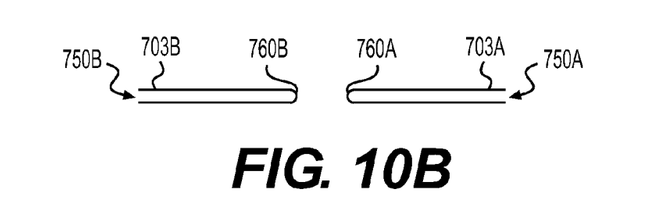
Figure 10C:
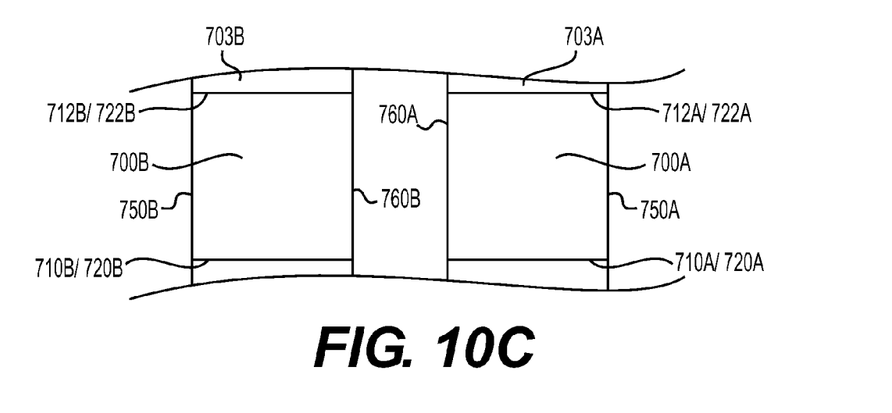

FIGS. 10(A)-10(C) depict the formation of bags 700A and 700B from a tubular blown film 702 according to a further embodiment of our invention. In this embodiment, a tubular blown film 702 is cut in two places, specifically, along lines A-A and B-B, as shown in cross section of tubular blown film 702 in FIG. 10(A). When the tubular blown film 702 is collapsed as shown in FIGS. 10(B) and 10(C), the cuts in the tubular blown film 702 result in two separate films 703A and 703B being formed, with the film 703A including the bag 700A, and the other film 703B including the bag 700B. In these two films 703A and 703B, the cut sides of the blown film 702 form the open sides 750A and 750B of bags 700A and 700B, while the bottom sides 760A and 760B of the bags 700A and 700B are formed opposite to the cut, open sides 750A and 750B. As with the embodiments described above, because the open sides 750A and 750B are formed by cutting the tubular blown film 702, in this embodiment, the perforation lines 710A, 710B, 712A, and 712B may be formed in the same area as the seal lines 720A, 720B, 722A, and 722B.

In the above-described embodiments, a roll of connected bags is formed using a tubular blown film process. As also described above, such a roll of connected bags has many applications. In alternative embodiments, however, a tubular blown film process may be used to directly form individual bags that are separated from each other in the process, rather than producing a roll of unseparated bags. For example, instead of merely forming perforations lines in the tubular blown film, the film may be completely split in the manufacturing process in order to provide the separate bags.

It should be apparent that although several embodiments of plastic bags and processes for forming plastic bags are described above, many of the features from a given specific embodiment might be used in another specific embodiment. For example, even though some of the specifically described embodiments do not include a sealing closure mechanism for sealing the opening of the bags, the sealing closure mechanisms described in other embodiments may be incorporated into any embodiment using the techniques described herein. As another example, the different configurations of the edges of the lips of the bags that are described in different embodiments may be provided in any given embodiment.

Further, although this invention has been described with respect to certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application, and the equivalents thereof, rather than by the foregoing description.

INDUSTRIAL APPLICABILITY

The invention described herein can be used in the commercial production of plastic storage bags. Such storage bags have a wide variety of uses, such as being utilized to store food, chemicals, or other substances.

We claim:

1. A process of manufacturing a roll of plastic bags, the process comprising:
   forming a tubular blown film;
   cutting the tubular blown film to form a first edge and a second edge in the tubular blown film;
   collapsing the tubular blown film so that the tubular blown film includes a first side including the first edge, a second side including the second edge, and a fold connecting the first side and the second side;
   shifting the collapsed tubular blown film about the fold so that the first edge is offset from the second edge;
   perforating the first side and the second side of the collapsed tubular blown film to form a plurality of perforation lines on the first side and a plurality of perforation lines on the second side;
   connecting the first and second sides of the collapsed tubular blown film with a plurality of seals that extend from the first edge of the collapsed tubular blown film to the fold; and
   winding the collapsed tubular blown film into a roll.

2. The process according to claim 1, wherein the first edge includes at least one of a sinusoidal pattern, a repeating square shape, a repeating triangular shape, and a repeating saw tooth shape.

3. The process according to claim 1, wherein the plurality of perforation lines on the first side of the collapsed tubular blown film extends in substantially straight lines from the first edge of the collapsed tubular blown film to the fold, and
   wherein the plurality of perforation lines on the second side of the collapsed tubular blown film extends in substantially straight lines from the second edge of the collapsed tubular blown film to the fold.

4. The process according to claim 1, further comprising a step of providing sealing closure mechanisms to the collapsed tubular blown film.

5. A roll of connected plastic bags that are to be separated from each other, the roll comprising:
   a tubular blown film including (i) a first edge, (ii) a second edge, (iii) a first side, (iv) a second side, (v) a plurality of perforation lines extending along the first side of the tubular blown film, (vi) a plurality of perforation lines extending along the second side of the tubular blown film, each of the plurality of perforation lines on the second side of the tubular blown film corresponding to one of the plurality of perforation lines on the first side of the tubular blown film, (vii) a fold about which the first side of the tubular blown film is connected to the second side of the tubular blown film, wherein the fold forms an edge of the tubular blown film that is opposite to the first and second edges, and the entirety of the first edge is positioned at a distance closer to the fold than the second edge is distanced from the fold, and (viii) a plurality of seal lines extending from the first edge of the tubular blown film to the fold, the seal lines connecting the first side of the tubular blown film and the second side of the tubular blown film,
   wherein a plastic bag to be separated from the roll is delimited by the second edge of the tubular blown film, two of the plurality of perforation lines on the first side of the tubular blown film, two of the perforation lines on the second side of the tubular blown film, and the fold, with the bag encompassing two of the plurality of seal lines, and
   wherein the first edge is formed in one of a sinusoidal pattern, a repeating square shape, a repeating triangular shape, and a repeating saw tooth shape.

6. The roll according to claim 5, wherein the perforation lines on the first side of the tubular blown film extend in substantially straight lines from the first edge of the tubular blown film to the fold, and
   wherein the perforation lines on the second side of the tubular blown film extend in substantially straight lines from the second edge of the tubular blown film to the fold.

7. The roll according to claim 5, further comprising a plurality of sealing closure mechanisms, each of the sealing closure mechanisms being provided adjacent to the first and second edges.

* * * * *